(12) United States Patent
Oikawa (10) Patent No.: US 11,047,374 B2
(45) Date of Patent: Jun. 29, 2021

(54) CRYOPUMP AND GATE VALVE

(71) Applicant: SUMITOMO HEAVY INDUSTRIES, LTD., Tokyo (JP)

(72) Inventor: Ken Oikawa, Nishitokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 121 days.

(21) Appl. No.: 16/102,727

(22) Filed: Aug. 14, 2018

(65) Prior Publication Data
US 2018/0355858 A1   Dec. 13, 2018

Related U.S. Application Data

(63) Continuation of application No. PCT/JP2017/004505, filed on Feb. 8, 2017.

(30) Foreign Application Priority Data

Feb. 15, 2016   (JP) ............................. JP2016-026251

(51) Int. Cl.
| F04B 37/08 | (2006.01) |
| F16K 51/02 | (2006.01) |
| F16K 3/02 | (2006.01) |
| F04B 37/16 | (2006.01) |

(52) U.S. Cl.
CPC ............ *F04B 37/085* (2013.01); *F04B 37/08* (2013.01); *F04B 37/16* (2013.01); *F16K 3/0281* (2013.01); *F16K 51/02* (2013.01)

(58) Field of Classification Search
CPC ........ F04B 37/05; F04B 37/058; F04B 37/16; F25B 9/14; F16K 3/0281
See application file for complete search history.

(56) References Cited

U.S. PATENT DOCUMENTS

| 9,789,420 | B2 | 10/2017 | Oikawa | |
| 2003/0150220 | A1* | 8/2003 | Foster | F04B 37/08 62/55.5 |
| 2010/0011784 | A1* | 1/2010 | Longsworth | F04B 37/08 62/55.5 |
| 2013/0061609 | A1* | 3/2013 | Fukuda | F04B 37/08 62/55.5 |

FOREIGN PATENT DOCUMENTS

| JP | 2006-022684 A | 1/2006 |
| JP | 2011-033007 A | 2/2011 |
| JP | 2013-139822 A | 7/2013 |
| JP | 5444545 B2 | 3/2014 |
| JP | 2014124582 A | 7/2014 |

* cited by examiner

*Primary Examiner* — Brian M King
(74) *Attorney, Agent, or Firm* — HEA Law PLLC (57) ABSTRACT

A cryopump includes a cryopump flange for attachment to the flange on a gate valve, and an annular baffle that axially extends toward the gate valve from the cryopump flange such that the annular baffle forms an annular orifice in association with a valve plate component of the gate valve. The annular orifice may be defined between an upper surface of the annular baffle and the valve plate.

15 Claims, 4 Drawing Sheets

CRYOPUMP AND GATE VALVE

INCORPORATION BY REFERENCE

The entire contents of Japanese Patent Application No. 2016-026251, and of International Patent Application No. PCT/JP2017/004505, on the basis of each of which priority benefits are claimed in an accompanying application data sheet, are incorporated herein by reference.

BACKGROUND

Technical Field

The present invention relates in particular embodiments to cryopumps and gate valves.

Description of Related Art

A cryopump is a vacuum pump that traps a gas by condensing or adsorbing the gas with a cryopanel cooled to an extremely low temperature. Attached to a vacuum chamber, a cryopump evacuates the vacuum chamber in that way. Between the cryopump and the vacuum chamber a gate valve may be installed.

SUMMARY

The invention according to one aspect makes available a cryopump that attaches to a gate valve provided with a gate-valve flange and a valve plate. The cryopump includes a cryopump flange that attaches to the gate valve flange, and an annular baffle that axially extends toward the gate valve from the cryopump flange when the cryopump is attached to the gate valve, such that the annular baffle forms an annular orifice in association with the valve plate.

The invention according to another aspect makes available a gate valve including a valve plate, a gate valve flange provided with a valve seat for the valve plate, and an annular baffle that extends circumferentially along the gate valve flange such that the annular baffle forms an annular orifice in association with the valve plate.

DETAILED DESCRIPTION

The cryopump is an accumulating vacuum pump, meaning that a gas is accumulated in the cryopump via a vacuum pumping operation of the cryopump. As the gas is accumulated, the pumping speed of the cryopump gradually decreases. Therefore, regeneration of the cryopump is periodically performed in order to discharge the accumulated gas from the cryopump and to recover the initial pumping speed. A vacuum-pumping operation period between preceding regeneration and following regeneration is called a regeneration interval. During the regeneration, the vacuum pumping operation of the cryopump cannot be performed. Therefore, it is desirable for the regeneration interval to be as long as possible.

One of uses of the cryopump is in a vacuum process device such as a PVD device. In the vacuum process device, a given vacuum process may be repeatedly performed. A main role of the cryopump in such a device is maintaining process pressure suitable for the vacuum process.

The process pressure is not required to be constant at all times, and a relatively high process pressure may be used in some processes. A typical method of increasing process pressure is to increase the flow rate of the process gas introduced into the vacuum chamber. However, a problem with such a method is that it shortens the regeneration interval. This is because an increase in the flow rate of an introduced gas results in an increase in the amount of flowing-in gas.

The opening of the gate valve may be adjusted in order to overcome such a trade-off relationship. During a process, the valve body (also called valve plate) of the gate valve is held at an intermediate position between a fully open position and a fully closed position. It is possible to increase the process pressure by decreasing the conductance of the pumping system, and in that way, the effective pumping speed of the cryopump.

However, the present inventor has recognized that there is a limit on the degree to which the process pressure can be adjusted by using only the gate valve, and thus that there is room for improvement.

It is desirable to provide a cryopump and a gate valve that contribute to increasing process pressure without increasing the flow rate of the process gas in a vacuum process device.

It should be understood that what may be obtained by substituting constituent elements or expressions in the embodiments of the invention with each other between methods, devices, systems, or the like may also be in effect aspects of the invention.

Embodiments of the invention make available a cryopump and a gate valve that contribute to increasing process pressure without increasing the flow rate of the process gas in a vacuum process device.

Hereinafter, embodiments of the invention will be described in detail with reference to drawings. Note that the same reference numerals are assigned to the same elements, and repetitive descriptions thereof will be omitted in the description. In addition, configurations described below are merely exemplary and do not limit the scope of the invention.

Figure 1:
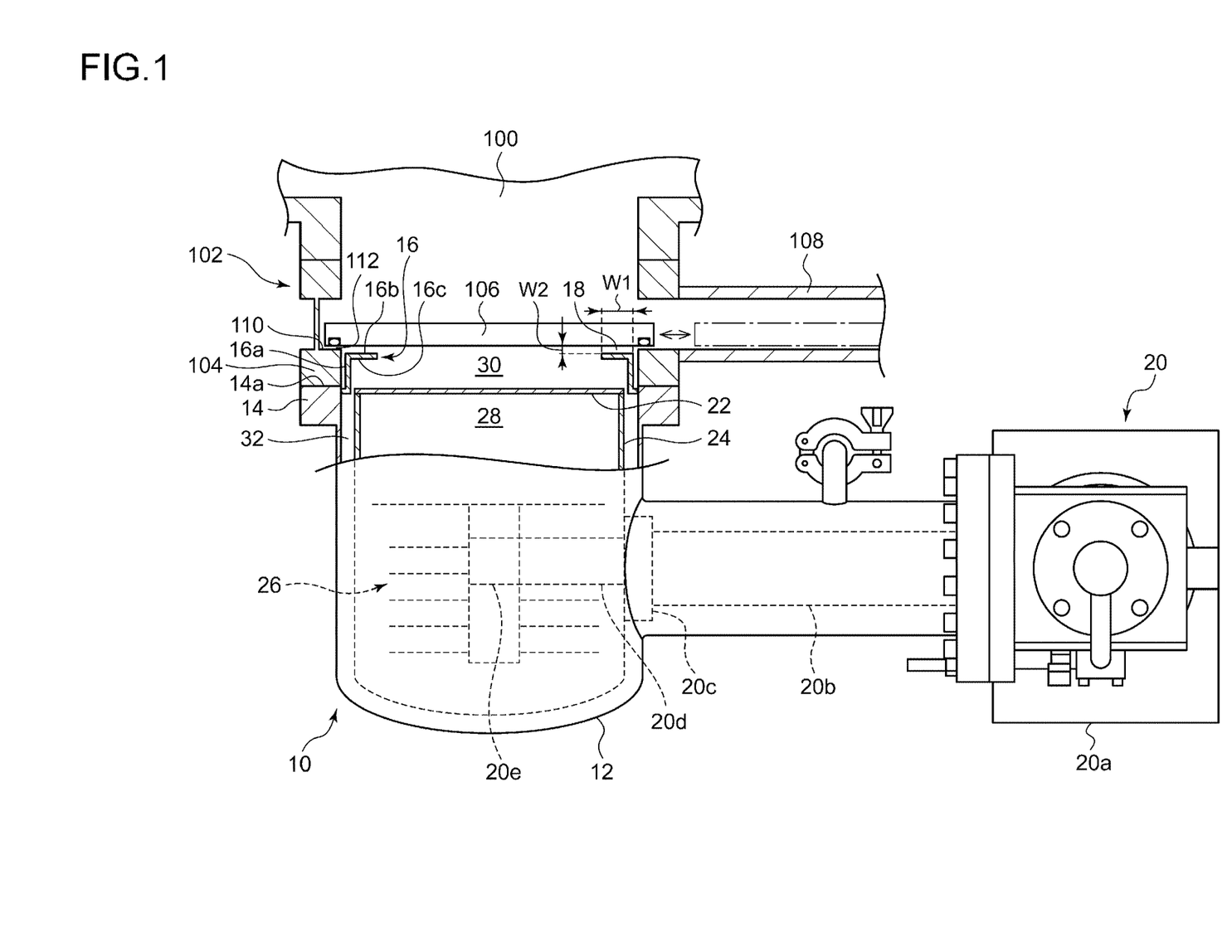
FIG. 1 is a view schematically illustrating a cryopump according to an embodiment of the invention.
Figure 2:
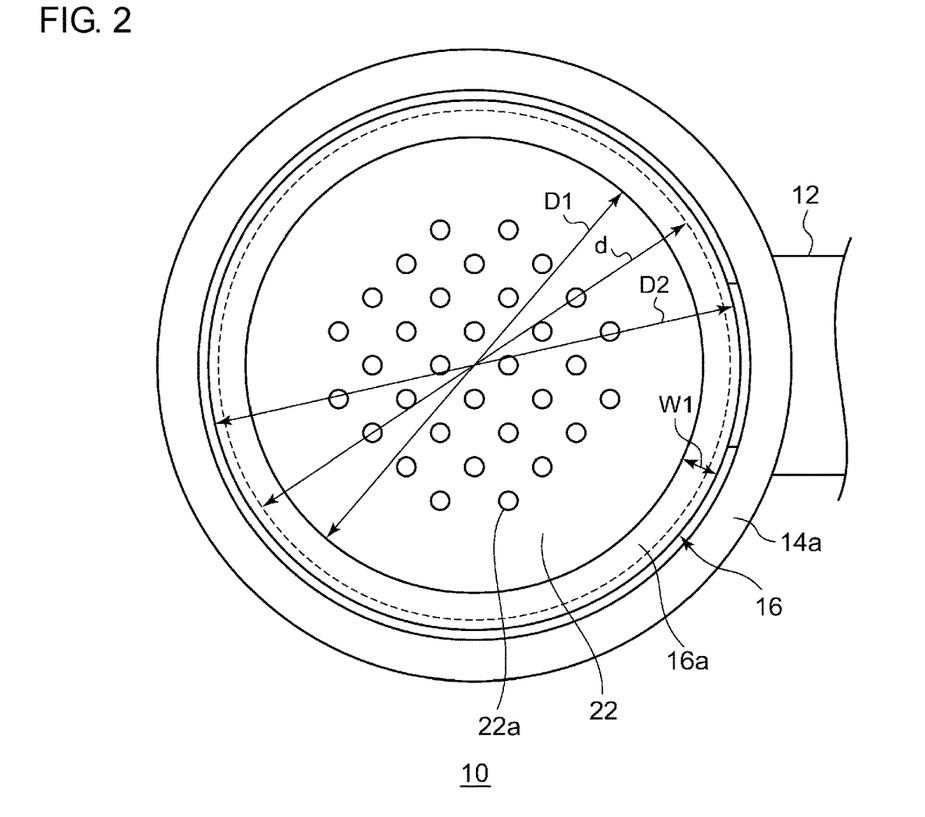
FIG. 2 schematically illustrates the cryopump according to the embodiment of the invention, as seen from a gate valve side.

FIG. 1 is a view schematically illustrating a cryopump 10 according to an embodiment of the invention. FIG. 2 schematically illustrates the cryopump 10 according to the embodiment of the invention as seen from a gate-valve end.

The cryopump 10 is attached to a vacuum chamber 100 of, for example, a PVD device or another vacuum process device and is used to increase the degree of vacuum in the vacuum chamber 100 to a level required for a predetermined vacuum process.

A gate valve 102 is installed between the cryopump 10 and the vacuum chamber 100. The gate valve 102 is provided with a gate valve flange 104, a valve plate 106, and a valve plate accommodation portion 108. The valve plate 106 is a valve body of the gate valve 102 and the gate valve flange 104 is provided with a valve seat 110. When the valve plate 106 comes into close contact with the valve seat 110, the gate valve 102 is fully closed. The valve plate 106 closes an intake port 30 of the cryopump 10, whereby gas is prevented from flowing to the cryopump 10 from the vacuum chamber 100. When the valve plate 106 is apart from the valve seat 110 and is accommodated in the valve plate accommodation portion 108 as represented by the dotted-dashed line in FIG. 1, the gate valve 102 is fully opened.

The position of the valve plate 106 illustrated in FIG. 1 is an intermediate position between a fully open position and a fully closed position. As illustrated in FIG. 1, the valve plate 106 is slightly apart from the valve seat 110 and a gate valve clearance 112 is formed between the valve plate 106 and the valve seat 110. The shape of the gate valve clearance 112 can be changed by moving the valve plate 106.

Changing the gate valve clearance 112 changes the conductance of the pumping system, whereby the process pressure in the vacuum chamber 100 is adjusted in accordance with the change in conductance of the pumping system. When the gate valve clearance 112 is narrow, the process pressure is high, and when the gate valve clearance 112 is wide, the process pressure is low. In this way, the gate valve 102 can be used to adjust the process pressure in the vacuum chamber 100.

The cryopump 10 is provided with a cryopump container 12, a cryopump flange 14, and an annular baffle 16. In addition, the cryopump 10 is provided with a cryocooler 20, with an inlet cryopanel 22 and a radiation shield 24, wherein the inlet cryopanel 22 and the radiation shield 24 may be collectively referred to as a first cryopanel unit, and with a second cryopanel unit 26.

The cryopump container 12 is a casing of the cryopump 10, which accommodates the cryocooler 20, the inlet cryopanel 22, the radiation shield 24, and the second cryopanel unit 26, and is a vacuum container that is configured for maintaining an internal space 28 in the cryopump 10 as a vacuum atmosphere. The cryopump container 12 is attached to a room temperature portion 20a of the cryocooler 20. The cryopump container 12 surrounds the radiation shield 24 and the inlet cryopanel 22. The radiation shield 24, along with the inlet cryopanel 22, surrounds the second cryopanel unit 26.

The cryopump flange 14 extends radially outward from a front end of the cryopump container 12. The cryopump flange 14 is provided over the entire circumference of the front end of the cryopump container 12.

The intake port 30 of the cryopump 10 is defined radially inward of the cryopump flange 14. Gas enters the internal space 28 of the cryopump 10 from the vacuum chamber 100 through the gate valve 102 and the intake port 30.

The cryopump flange 14 is attached to the gate valve flange 104, and thus the cryopump 10 is attached to the vacuum chamber 100. The cryopump flange 14 is provided with a flange upper surface 14a that comes into contact with the gate valve flange 104.

The annular baffle 16 is provided with an annular baffle cylindrical portion 16a that is adjacent to the radially inner side of the cryopump flange 14, wherein the annular baffle cylindrical portion 16a extends circumferentially along the cryopump flange 14. A lower end of the annular baffle cylindrical portion 16a is fixed to the cryopump flange 14, and a flange-like portion extends radially inwards from an upper end of the annular baffle cylindrical portion 16a. Thus, the annular baffle 16 is provided along the entire circumference of the intake port 30, and disposed on the outermost side of the intake port 30.

The flange-like portion of the annular baffle 16 is provided with an annular baffle upper surface 16b and an annular baffle lower surface 16c. The annular baffle upper surface 16b is in parallel with the valve seat 110 and the valve plate 106 and faces the outer circumferential margin of the valve plate 106 (when valve plate 106 is positioned to be adjacent to gate valve flange 104). The annular baffle lower surface 16c faces the outer circumferential margin of the inlet cryopanel 22. The inner diameter D1 defined by the annular baffle upper surface 16b is smaller than the outer diameter d of the inlet cryopanel 22, and the outer diameter D2 defined by the annular baffle upper surface 16b is larger than the outer diameter d of the inlet cryopanel 22.

The annular baffle 16 axially extends toward the gate valve 102 from the cryopump flange 14 such that the annular baffle 16 forms an annular orifice 18 in association with the valve plate 106. The axial length of the extending portion, that is, the annular baffle cylindrical portion 16a is determined such that the annular baffle cylindrical portion 16a does not interfere with the valve plate 106. Thus, the annular baffle 16 is shaped like an axially short, hollow railcar wheel, such that the annular baffle 16 is disposed inward of the gate valve flange 104.

The annular baffle upper surface 16b is disposed close to the valve plate 106 in the axial direction compared with the flange upper surface 14a. The annular orifice 18 is defined between the annular baffle upper surface 16b and the valve plate 106. The annular baffle upper surface 16b is in parallel with the flange upper surface 14a and has substantially the same axial height as that of the valve seat 110 (that is, upper surface of gate valve flange 104). The annular baffle upper surface 16b may have an axial height that is slightly smaller than that of the valve seat 110. In this way, the annular baffle upper surface 16b forms the annular orifice 18 in association with the lower surface of the valve plate 106.

The radial width W1 of the annular baffle upper surface 16b is larger than two times the axial gap W2 between the annular baffle upper surface 16b and the valve plate 106. In other words, the valve plate 106 may be positioned to make the axial gap W2 between the lower surface of the valve plate 106 and the annular baffle upper surface 16b less than or equal to half the radial width W1 of the annular baffle upper surface 16b.

Alternatively, the radial width W1 of the annular baffle upper surface 16b may be larger than two times the difference between the axial height of the annular baffle upper surface 16b and the axial height of the valve seat 110. Such configuration enables sufficient reduction in the conductance of the annular orifice 18.

The annular baffle 16 is a portion of the cryopump container 12 and is not in contact with the inlet cryopanel 22 and the radiation shield 24. Since the annular baffle 16 is not cooled by the cryocooler 20 and has approximately the same temperature (for example, room temperature) as that of the cryopump container 12, no gas condenses on the surface of the annular baffle 16, such that the annular orifice 18 is not blocked by condensate. Therefore, advantageously, the annular orifice 18 can be continuously used as a gas flow path. On the other hand, if the annular baffle 16 is provided on the inlet cryopanel 22 or other low-temperature part, condensate would accumulate on the surface and the annular orifice 18 might become blocked.

A plurality of small holes 22a, which allow gas to flow into the cryopump 10 from outside the cryopump 10, penetrate the inlet cryopanel 22. The annular baffle 16 is disposed radially outward of the small holes 22a. The annular baffle 16 does not cover the small holes 22a.

Therefore, when the valve plate 106 is housed, the annular baffle 16 does not hinder gas from the vacuum chamber 100 from entering the internal space 28 of the cryopump 10 through the inlet cryopanel 22. Accordingly, in cases where low process pressure is required, the low process pressure can be realized by opening the gate valve 102.

Next, other constituent elements of the cryopump 10 will be described.

Note that, hereinafter, the expressions "axial direction" and "radial direction" may be used for simple indication of positional relationships between the constituent elements of the cryopump 10. The axial direction is a direction across the intake port 30 (longitudinal orientation in FIG. 1) and the radial direction is a direction along the intake port 30 (transverse orientation in FIG. 1). For convenience, in respect of the axial direction, a position relatively close to the intake port 30 may be referred to as an "upper position" and a position relatively far from the intake port 30 may be referred to as a "lower position." That is, a position relatively close to a bottom portion of the cryopump 10 may be referred to as the "upper position" and a position relatively far from the bottom portion may be referred to as the "lower position." In respect of the radial direction, a position relatively close to the center of the intake port 30 may be referred to as an "inner position" and a position relatively close to a periphery of the intake port 30 may be referred to as an "outer position." Note that such expressions are not related to displacement from situations where the cryopump 10 is attached to the vacuum chamber 100. For example, the cryopump 10 may be attached to the vacuum chamber 100 with the intake port 30 facing the lower position in the vertical direction.

In addition, a direction encircling the axial direction may be referred to as the "circumferential direction." The circumferential direction is a second direction along the intake port 30 and is a tangential direction orthogonal to the radial direction.

The cryocooler 20 is, for example, a Gifford-McMahon cryocooler (so-called GM cryocooler) or like cryocooler. The cryocooler 20 is a two-stage cryocooler. Therefore, the cryocooler 20 is provided with a first cylinder 20b, a first cooling stage 20c, a second cylinder 20d, and a second cooling stage 20e, in addition to the room temperature portion 20a.

The cryocooler 20 is configured to cool the first cooling stage 20c to a first cooling temperature and to cool the second cooling stage 20e to a second cooling temperature. The second cooling temperature is a temperature lower than the first cooling temperature. For example, the first cooling stage 20c is cooled to approximately 65 K to 120 K, preferably 80 K to 100 K, and the second cooling stage 20e is cooled to approximately 10 K to 20 K.

The first cylinder 20b and the second cylinder 20d forma cryocooler structure section in which the second cooling stage 20e is structurally supported on the first cooling stage 20c and the first cooling stage 20c is structurally supported on the room temperature portion 20a of the cryocooler 20. The first cylinder 20b and the second cylinder 20d coaxially extend along the radial direction. The first cylinder 20b connects the room temperature portion 20a of the cryocooler 20 to the first cooling stage 20c, and the second cylinder 20d connects the first cooling stage 20c to the second cooling stage 20e. The room temperature portion 20a, the first cylinder 20b, the first cooling stage 20c, the second cylinder 20d, and the second cooling stage 20e are linearly arranged in a single row, in that order.

A first displacer and a second displacer (neither shown) are disposed respectively in the first cylinder 20b and the second cylinder 20d such that the first displacer and the second displacer can reciprocate. A first regenerator and a second regenerator (neither shown) are incorporated respectively into the first and second displacers. In addition, the room temperature portion 20a is provided with a driving mechanism (not shown) that reciprocates the first and second displacers. The driving mechanism includes a flow path switching mechanism that switches working-gas flow paths such that supply of a working gas (for example, helium) into the cryocooler 20 and discharge of the working gas are periodically repeated.

The cryocooler 20 is connected to a working gas compressor (not shown). The cryocooler 20 cools the first cooling stage 20c and the second cooling stage 20e by causing a working gas compressed by the compressor to expand in the cryocooler 20. The working gas after the expansion is recovered by the compressor and is compressed again. The cryocooler 20 produces cooling by repeating a heat cycle including supply and discharge of a working gas and reciprocation of the first and second displacers, the reciprocation being synchronized with the supply and discharge of the working gas.

The illustrated cryopump 10 is a so-called horizontal cryopump. Generally, the horizontal cryopump is a cryopump in which the central axis of the cryocooler 20 is orthogonal to the central axis of the radiation shield 24, and the cryocooler 20 is disposed such that the second cooling stage 20e is situated in a central portion of the radiation shield 24.

The radiation shield 24 is provided to protect the second cryopanel unit 26 from radiant heat of the cryopump container 12. The radiation shield 24 is thermally coupled to the first cooling stage 20c. Therefore, the first cryopanel unit is cooled to the first cooling temperature. A gap 32 is present between the radiation shield 24 and the cryopump container 12 such that the radiation shield 24 is not in contact with the cryopump container 12.

The inlet cryopanel 22 is disposed to cover a main opening of the radiation shield 24 such that the second cryopanel unit 26 is protected from radiant heat from heat sources (for example, a heat source in the vacuum chamber 100) external to the cryopump 10. The inlet cryopanel 22 restrains not only radiant heat but also gas from entering the internal space 28. The inlet cryopanel 22 is thermally coupled to the first cooling stage 20c via the radiation shield 24. Gas condensing at the first cooling temperature (for example, water) is trapped on the surface of the inlet cryopanel 22.

The inlet cryopanel 22 is a single flat plate (for example, circular plate) that extends across the intake port 30. A dimension (for example, diameter) of the inlet cryopanel 22 is substantially the same as a dimension of the main opening in the radiation shield 24.

The small holes 22a are arranged regularly on the inlet cryopanel 22. The small holes 22a are provided at equal intervals in two linear directions which are orthogonal to each other, wherein a grid of the small holes 22a is formed. Alternatively, the small holes 22a may be provided at equal intervals in the radial direction and the circumferential direction. The geometry of the small hole 22a is, for example, a circular form, but the shape thereof is not limited to being circular, and the small holes 22a may be openings having a rectangular shape or the like, linear slits, curved slits, or cuts formed on the outer circumferential portion of the inlet cryopanel 22.

Instead of a single plate with holes as described above, the inlet cryopanel 22 may be provided with, for example, a plurality of small plates. Alternatively, the inlet cryopanel 22 may be provided with louvers or chevron-patterned openings in concentric or in a grid-like form.

The second cryopanel unit 26 is provided with a plurality of cryopanels and the cryopanels are attached to the second cooling stage 20e such that the cryopanels surround the second cooling stage 20e. The second cryopanel unit 26 is not in contact with the first cryopanel unit. The second cryopanel unit 26 is thermally coupled to the second cooling stage 20e and the second cryopanel unit 26 is cooled to the second cooling temperature.

As described above, the cryopump 10 is provided with the annular baffle 16 that axially extends toward the gate valve 102 from the cryopump flange 14 such that the annular baffle 16 forms the annular orifice 18 in association with the valve plate 106. In this manner, a narrow gas flow path (that is, an annular orifice 18) is formed between the inlet cryopanel 22 and the valve plate 106.

According to this embodiment, the relative positional relationship between the valve plate 106 and the annular baffle 16 in connection with opening and closing of the gate valve 102 can be utilized to expand the adjustable range of the pumping system's conductance. Constituting the annular orifice 18 in addition to the gate valve clearance 112 makes it possible to reduce the conductance further. Process pressure can be increased by decreasing the effective pumping speed of the cryopump 10, without increase in flow rate of process gas in the vacuum chamber 100. The flow rate of the process gas not being increased contributes to a large regeneration interval of the cryopump 10.

Figure 3:
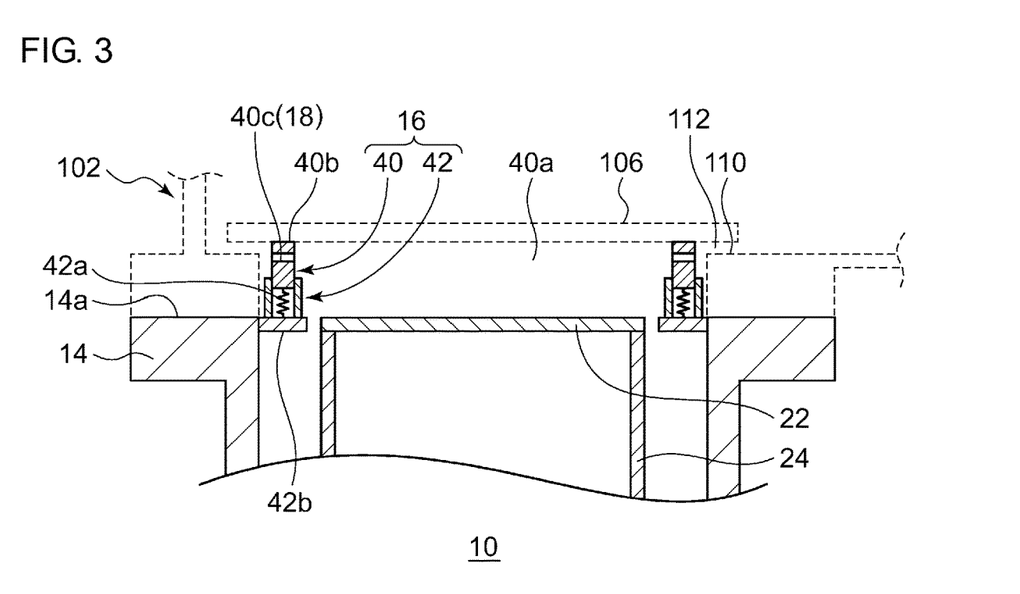
FIG. 3 is a view schematically illustrating a portion of the cryopump according to another embodiment of the invention.

FIG. 3 is a view schematically illustrating a portion of the cryopump 10 according to another embodiment of the invention. In the embodiment described with reference to FIGS. 1 and 2, the annular orifice 18 is formed between the annular baffle 16 and the valve plate 106. However, in the embodiment that will be described below with reference to FIG. 3, the annular baffle 16 itself is provided with an equivalent of the annular orifice 18.

The annular baffle 16 axially extends toward the gate valve 102 from the cryopump flange 14 such that the annular baffle 16 forms the annular orifice 18 in cooperation with the valve plate 106. The annular baffle 16 extends in the circumferential direction along the cryopump flange 14. The annular baffle 16 is a portion of the cryopump container 12 and is not in contact with the inlet cryopanel 22 and the radiation shield 24.

The annular baffle 16 is provided with a ring member 40. The ring member 40 is provided with a ring central opening 40a and a ring upper surface 40b, and is positioned along the axial direction such that the ring central opening 40a is closed when the valve plate 106 and the ring upper surface 40b come into contact with each other. The ring member 40 is provided with an opening portion (for example, a slit) 40c that penetrates the ring member 40 in the radial direction. When the valve plate 106 closes the ring central opening 40a, the opening portion 40c serves as the annular orifice 18. In this way, the annular baffle 16 forms the annular orifice 18 in association with the lower surface of the valve plate 106.

The radial width of the opening portion 40c is larger than two times the axial height of the opening portion 40c. In this case, it is possible to sufficiently reduce the conductance of the annular orifice 18 as with the embodiment described with reference to FIGS. 1 and 2.

In addition, the annular baffle 16 is provided with a holder 42. The holder 42 is configured to elastically hold the ring member 40 in the axial direction and is fixed to the cryopump flange 14. The holder 42 is provided with a spring member 42a and a ring member holding portion 42b. The ring member holding portion 42b is fixed to the cryopump flange 14. The ring member holding portion 42b forms a recess portion that receives a lower portion of the ring member 40, and the spring member 42a is accommodated in the recess portion. One end of the spring member 42a is connected to the lower portion of the ring member 40, and the other end of the spring member 42a is connected to the bottom of the recess portion. The opening portion 40c is formed in an upper portion of the ring member 40 and is positioned outward of the recess portion. Since the ring member 40 is elastically held in the axial direction as described above, shock that occurs when the valve plate 106 comes into contact with the ring upper surface 40b is alleviated.

Since the ring member 40 is elastically held, the ring upper surface 40b may have an axial height slightly greater than that of the valve seat 110. The gate valve clearance 112 is formed between the valve plate 106 and the valve seat 110.

The ring upper surface 40b may have substantially the same axial height as that of the valve seat 110. Alternatively, the ring upper surface 40b may have an axial height slightly smaller than that of the valve seat 110. As with the embodiment described with reference to FIGS. 1 and 2, one more annular orifice may be defined between the ring upper surface 40b and the valve plate 106. The ring member 40 may be directly fixed to the cryopump flange 14, rather than via the holder 42.

According to the embodiment described with reference to FIG. 3, the annular orifice 18 is formed in addition to the gate valve clearance 112, as with the embodiment described with reference to FIGS. 1 and 2. Therefore, it is possible to increase process pressure by decreasing the effective pumping speed of the cryopump 10, without an increase in flow rate of process gas in the vacuum chamber 100.

Figure 4:
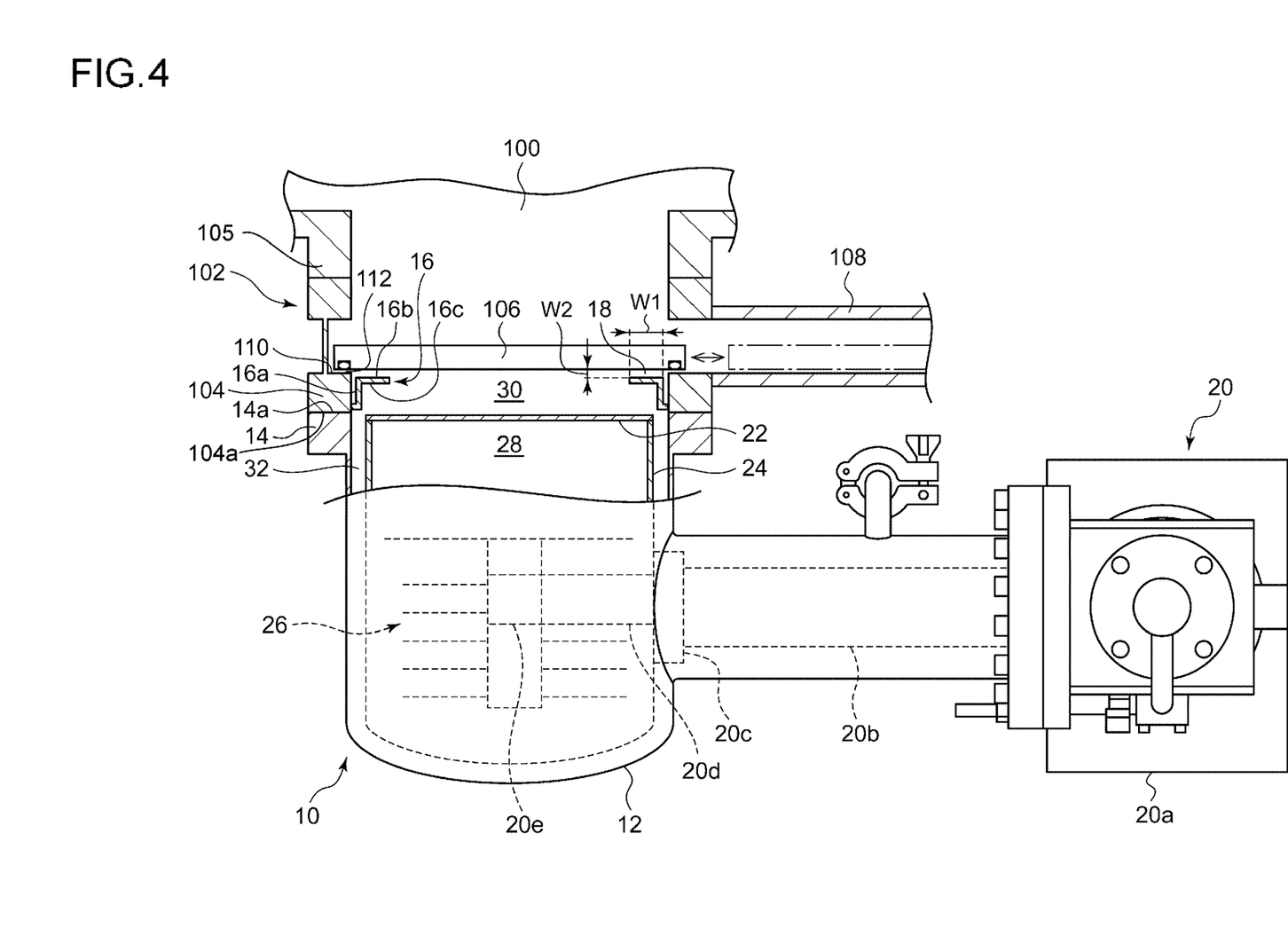
FIG. 4 is a view schematically illustrating a gate valve according to an embodiment of the invention.

FIG. 4 is a view schematically illustrating the gate valve 102 according to another embodiment of the invention. In this embodiment, the annular baffle 16 is provided in the gate valve 102 instead of the cryopump 10. The gate valve 102 is attached to the vacuum chamber 100 of a vacuum process device. The gate valve 102 is installed between the vacuum chamber 100 and the cryopump 10, or another vacuum pump such as a turbomolecular pump, or another vacuum device.

The gate valve 102 is provided with the gate valve flange 104, the valve plate 106, and the valve plate accommodation portion 108. The valve plate 106 is a valve body of the gate valve 102, and the gate valve flange 104 is provided with the valve seat 110. When the valve plate 106 comes into close contact with the valve seat 110, the gate valve 102 is fully closed. Since the valve plate 106 closes the intake port 30 of the cryopump 10, a gas is prevented from flowing to the cryopump 10 from the vacuum chamber 100. When the valve plate 106 is apart from the valve seat 110 and is accommodated in the valve plate accommodation portion 108 as represented by the dotted-dashed chain line in FIG. 4, the gate valve 102 is fully opened.

The position of the valve plate 106 illustrated in FIG. 4 is an intermediate position between a fully open position and a fully closed position. As illustrated in FIG. 4, the valve plate 106 is slightly apart from the valve seat 110 and the gate valve clearance 112 is formed between the valve plate 106 and the valve seat 110. The shape of the gate valve clearance 112 can be changed by moving the valve plate 106.

Changing the gate valve clearance 112 changes the conductance of the pumping system, whereby the process pressure in the vacuum chamber 100 is adjusted in accordance with the change in conductance of the pumping system. When the gate valve clearance 112 is narrow, the process pressure is high, and when the gate valve clearance 112 is wide, the process pressure is low. In this way, the gate valve 102 can be used to adjust the process pressure in the vacuum chamber 100.

The cryopump flange 14 is attached to the gate valve flange 104, and thus the cryopump 10 is attached to the vacuum chamber 100. The cryopump flange 14 is provided with the flange upper surface 14a that comes into contact with the gate valve flange 104. The gate valve flange 104 is provided with a flange lower surface 104a that comes into contact with the flange upper surface 14a of the cryopump flange 14. The flange lower surface 104a is on the reverse side from the valve seat 110 in the axial direction.

The annular baffle 16 is provided with the annular baffle cylindrical portion 16a that is adjacent to the radially inner side of the gate valve flange 104, wherein the annular baffle cylindrical portion 16a extends in the circumferential direction along the gate valve flange 104. The lower end of the annular baffle cylindrical portion 16a is fixed to the gate valve flange 104 in the vicinity of the flange lower surface 104a. A flange-like portion of the annular baffle 16 extends radially inwards from the upper end of the annular baffle cylindrical portion 16a. Thus, the annular baffle 16 is provided along the entire circumference of the gate valve 102.

The flange-like portion of the annular baffle 16 is provided with the annular baffle upper surface 16b and the annular baffle lower surface 16c. The annular baffle upper surface 16b is in parallel with the valve seat 110 and the valve plate 106 and faces the outer circumferential margin of the valve plate 106 (when valve plate 106 is positioned to be adjacent to gate valve flange 104). The annular baffle lower surface 16c faces the outer circumferential margin of the inlet cryopanel 22 (in case where gate valve 102 is attached to cryopump 10).

The annular baffle 16 extends in the circumferential direction along the gate valve flange 104 such that the annular baffle 16 forms the annular orifice 18 in association with the valve plate 106. The annular baffle 16 axially extends from the gate valve flange 104 toward another gate valve flange on the gate valve 102 (that is, second gate valve flange 105 attached to vacuum chamber 100). The axial length of the annular baffle 16 is determined such that the annular baffle 16 does not interfere with the valve plate 106. The annular baffle 16 is thus shaped like an axially short, hollow railcar wheel, such that the annular baffle 16 is disposed inward of the gate valve flange 104.

The annular baffle upper surface 16b is disposed close to the valve plate 106 in the axial direction compared with the flange lower surface 104a. The annular orifice 18 is defined between the annular baffle upper surface 16b and the valve plate 106. The annular baffle upper surface 16b is in parallel with the flange lower surface 104a and has substantially the same axial height as that of the valve seat 110 (that is, upper surface of gate valve flange 104). The annular baffle upper surface 16b may have an axial height that is slightly smaller than that of the valve seat 110. In this manner, the annular baffle upper surface 16b forms the annular orifice 18 in association with the lower surface of the valve plate 106.

The radial width W1 of the annular baffle upper surface 16b is larger than two times the axial gap W2 between the annular baffle upper surface 16b and the valve plate 106. In other words, the valve plate 106 may be positioned to make the axial gap W2 between the lower surface of the valve plate 106 and the annular baffle upper surface 16b less than or equal to half the radial width W1 of the annular baffle upper surface 16b.

Alternatively, the radial width W1 of the annular baffle upper surface 16b may be larger than two times the difference between the axial height of the annular baffle upper surface 16b and the axial height of the valve seat 110. Such configuration enables sufficient reduction in the conductance of the annular orifice 18.

Since the annular baffle 16 is a portion of the gate valve 102, the annular baffle 16 is not in contact with a low-temperature portion of the cryopump 10 (inlet cryopanel 22, radiation shield 24, or like). Since the annular baffle 16 is not cooled by the cryocooler 20 and has approximately the same temperature (for example, room temperature) as that of the vacuum chamber 100, no gas condenses on the surface of the annular baffle 16, such that the annular orifice 18 is not blocked by condensate. Therefore, advantageously, the annular orifice 18 can be continuously used as a gas flow path.

As described above, the gate valve 102 is provided with the annular baffle 16 that forms the annular orifice 18 in association with the valve plate 106. According to this embodiment, the relative positional relationship between the valve plate 106 and the annular baffle 16 in connection with opening and closing of the gate valve 102 can be utilized to expand the adjustable range of the pumping system's conductance. Constituting the annular orifice 18 in addition to the gate valve clearance 112 makes it possible to reduce the conductance further. And process pressure in the vacuum chamber 100 can be increased.

Figure 5:
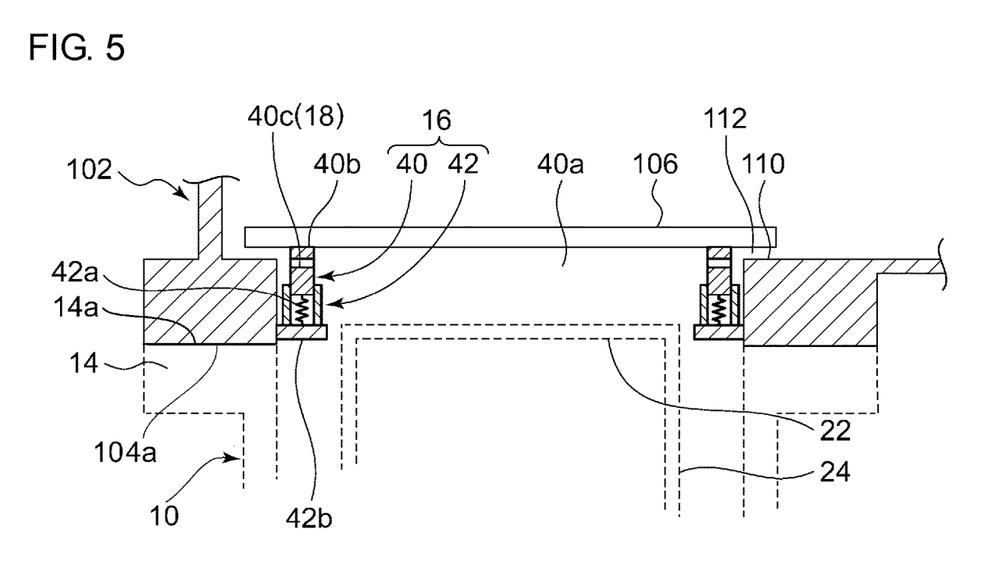
FIG. 5 is a view schematically illustrating a portion of a gate valve according to still another embodiment of the invention.

FIG. 5 is a view schematically illustrating a portion of the gate valve 102 according to still another embodiment of the invention. In the embodiment described with reference to FIG. 4, the annular orifice 18 is formed between the annular baffle 16 and the valve plate 106. However, in the embodiment that will be described below with reference to FIG. 5, the annular baffle 16 is provided with the annular orifice 18. The gate valve 102 may be installed on the cryopump 10 or another vacuum device. For the sake of understanding, FIG. 5 illustrates a case where the gate valve 102 is installed on the cryopump 10 and certain constituent elements (cryopump flange 14, inlet cryopanel 22, and radiation shield 24) of the vacuum chamber 100 are indicated by hidden lines. However, the annular baffle 16 is provided in the gate valve 102 instead of the cryopump 10.

The annular baffle 16 extends in the circumferential direction along the gate valve flange 104 such that the annular baffle 16 forms the annular orifice 18 in association with the valve plate 106. The annular baffle 16 is provided with the ring member 40. The ring member 40 is provided with the ring central opening 40a and the ring upper surface 40b and is positioned in the axial direction such that the ring central opening 40a is closed when the valve plate 106 and the ring upper surface 40b come into contact with each other. The ring member 40 is provided with the opening portion (for example, slit) 40c that penetrates the ring member 40 in the radial direction. When the valve plate 106 closes the ring central opening 40a, the opening portion 40c serves as the annular orifice 18. In this way, the annular baffle 16 forms the annular orifice 18 in association with the lower surface of the valve plate 106.

The radial width of the opening portion 40c is larger than two times the axial height of the opening portion 40c. In this case, it is possible to sufficiently reduce the conductance of the annular orifice 18 as with the embodiment described with reference to FIG. 4.

In addition, the annular baffle 16 is provided with the holder 42. The holder 42 is configured to elastically retain the ring member 40 in the axial direction and is fixed to the gate valve flange 104. The holder 42 is provided with the spring member 42a and the ring member holding portion 42b. The ring member holding portion 42b is fixed to the gate valve flange 104 in the vicinity of the flange lower surface 104a. The ring member holding portion 42b forms a recess portion that receives the lower portion of the ring member 40, and the spring member 42a is accommodated in the recess portion. One end of the spring member 42a is connected to the lower portion of the ring member 40, and the other end of the spring member 42a is connected to the bottom of the recess portion. The opening portion 40c is formed in an upper portion of the ring member 40 and is positioned outward of the recess portion. Since the ring member 40 is elastically retained in the axial direction as described above, shock that occurs when the valve plate 106 comes into contact with the ring upper surface 40b is alleviated.

Since the ring member 40 is elastically held, the ring upper surface 40b may have an axial height slightly larger than that of the valve seat 110. The gate valve clearance 112 is formed between the valve plate 106 and the valve seat 110.

The ring upper surface 40b may have substantially the same axial height as that of the valve seat 110. Alternatively, the ring upper surface 40b may have an axial height slightly smaller than that of the valve seat 110. As with the embodiment described with reference to FIG. 4, one more annular orifice may be defined between the ring upper surface 40b and the valve plate 106. The ring member 40 may be directly fixed to the gate valve flange 104, rather than via the holder 42.

According to the embodiment described with reference to FIG. 5, the annular orifice 18 is formed in addition to the gate valve clearance 112, as with the embodiment described with reference to FIG. 4. Therefore, it is possible to increase process pressure in the vacuum chamber 100.

Hereinabove, the embodiments of the invention have been described based on the examples. The present invention is not limited to the embodiments, and it will be understood by those skilled in the art that various design changes can be made ad various modification examples can be implemented, and that the modification examples also fall within the scope of the invention. It should be understood that the invention is not limited to the above-described embodiment, but may be modified into various forms on the basis of the spirit of the invention. Additionally, the modifications are included in the scope of the invention.

What is claimed is:

1. A cryopump for attachment to a gate valve provided with a gate valve flange and a valve plate, the cryopump comprising:
   a cryopump flange for attachment to the gate valve flange; and
   an annular baffle directly fixed to and contacting the cryopump flange and axially extending toward the gate valve from the cryopump flange when the cryopump is attached to the gate valve, such that the annular baffle forms an annular orifice in association with the valve plate.

2. The cryopump according to claim 1, wherein:
   the cryopump flange is provided with a flange upper surface that comes into contact with the gate valve flange when the cryopump is attached to the gate valve;
   the annular baffle is provided with an annular baffle upper surface that when the cryopump is attached to the gate valve is disposed axially nearer to the valve plate than the cryopump flange upper surface is; and
   the annular orifice is defined between the annular baffle upper surface and the valve plate when the cryopump is attached to the gate valve.

3. The cryopump according to claim 2, wherein a radial width of the annular baffle upper surface is larger than two times an axial gap between the annular baffle upper surface and the valve plate when the cryopump is attached to the gate valve.

4. The cryopump according to claim 1, wherein:
   the annular baffle is provided with a ring member provided with a ring central opening and a ring upper surface;
   the ring member is axially positioned such that the ring central opening is closed when the valve plate and the ring upper surface come into contact with each other when the cryopump is attached to the gate valve; and
   the ring member is provided with an opening portion that radially penetrates the ring member.

5. The cryopump according to claim 4, wherein a radial width of the opening portion is larger than two times an axial height of the opening portion.

6. The cryopump according to claim 4, wherein the annular baffle is further provided with a holder fixed to the cryopump flange and elastically retaining the ring member axially.

7. A gate valve comprising:
   a valve plate;
   a gate valve flange provided with a valve seat for the valve plate; and
   an annular baffle directly fixed to and contacting the gate valve flange and extending circumferentially along the gate valve flange such that the annular baffle forms an annular orifice in association with the valve plate.

8. The gate valve according to claim 7, wherein:
   the gate valve flange is provided with a flange lower surface on an axially reverse side of the gate valve flange from the valve seat;
   the annular baffle is provided with an annular baffle upper surface that is disposed axially nearer to the valve plate than the flange lower surface is; and
   the annular orifice is defined between the annular baffle upper surface and the valve plate.

9. The gate valve according to claim 8, wherein a radial width of the annular baffle upper surface is larger than two times an axial gap between the annular baffle upper surface and the valve plate.

10. The gate valve according to claim 7, wherein:
    the annular baffle is provided with a ring member provided with a ring central opening and a ring upper surface;
    the ring member is axially positioned such that the ring central opening is closed when closing of the gate valve brings the valve plate and the ring upper surface into contact with each other;
    and the ring member is provided with an opening portion that radially penetrates the ring member.

11. The gate valve according to claim 10, wherein a radial width of the opening portion is larger than two times an axial height of the opening portion.

12. The gate valve according to claim 10, wherein the annular baffle is further provided with a holder fixed to the gate valve flange and elastically retaining the ring member axially.

13. A cryopump for attachment to a gate valve provided with a gate valve flange and a valve plate, the cryopump comprising:
   a cryopump flange for attachment to the gate valve flange; and
   an annular baffle fixed to the cryopump flange and axially extending toward the gate valve from the cryopump flange when the cryopump is attached to the gate valve, such that the annular baffle forms an annular orifice in association with the valve plate,
   wherein the annular baffle is not cooled to a cryogenic temperature.

14. The cryopump according to claim 1, further comprising a radiation shield and an inlet cryopanel, wherein the annular baffle is not in contact with the radiation shield and is not in contact with the inlet cryopanel.

15. A gate valve comprising:
   a valve plate;
   a gate valve flange provided with a valve seat for the valve plate; and
   an annular baffle fixed to the gate valve flange and extending circumferentially along the gate valve flange such that the annular baffle forms an annular orifice in association with the valve plate,
   wherein, when the gate valve is attached to a cryopump, and the annular baffle is not cooled to a cryogenic temperature.

* * * * *